Figure 1:
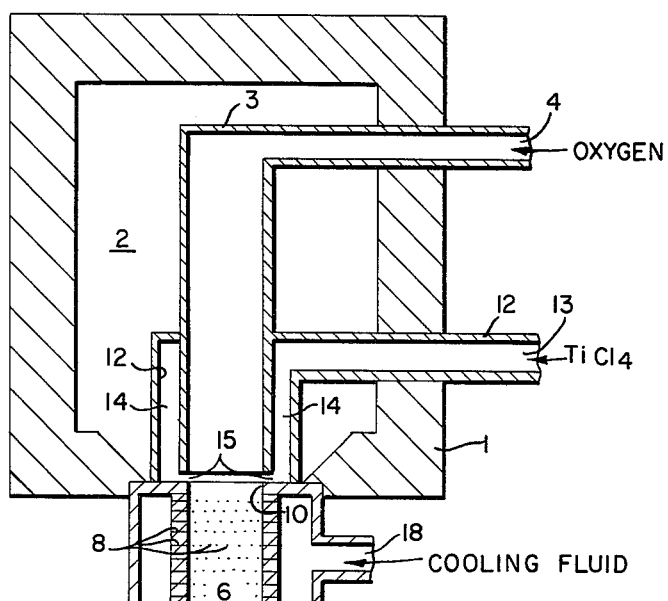

Aug. 31, 1965  W. E. KRUSE  3,203,763
PRODUCTION OF METAL OXIDES THROUGH OXIDATION OF METAL HALIDES
Filed Jan. 17, 1963

INVENTOR
WILLARD E. KRUSE

BY *John P. Hancock*

ATTORNEY

United States Patent Office 3,203,763
Patented Aug. 31, 1965

3,203,763
PRODUCTION OF METAL OXIDES THROUGH
OXIDATION OF METAL HALIDES
Willard E. Kruse, Dickson, Tenn., assignor to E. I. du
Pont de Nemours and Company, Wilmington, Del., a
corporation of Delaware
Filed Jan. 17, 1963, Ser. No. 252,081
7 Claims. (Cl. 23—202)

This invention relates to the production of metal oxides, particularly titanium dioxide, by the vapor phase oxidation of titanium tetrachloride, and more particularly to improved methods for the preparation of finely divided pigmentary titanium dioxide by the reaction of an oxygen-containing gas with vaporous titanium tetrachloride.

It is well known that titanium tetrachloride can be reacted with oxygen and oxygen-containing gases such as air, at elevated temperatures within a suitable reaction zone to form finely divided pigmentary titanium dioxide and chlorine gas in accordance with the following equation:

(1) 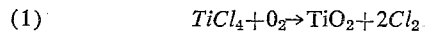 $TiCl_4 + O_2 \rightarrow TiO_2 + 2Cl_2$

During this reaction, which is usually carried out in an enclosed reaction zone or chamber, difficulty is encountered because of titanium dioxide deposition on the internal walls of the reactor and its tenacious adherence to such walls in the form of objectionable, hard scale. This poses a serious operating difficulty in the successful commercial manufacture by this reaction of high quality, pigmentary grade titanium dioxide. The $TiO_2$ which forms on the reactor walls frequently cannot be recovered in usable form and therefore presents a serious yield loss. Furthermore, this wall scale product when it flakes off and mixes with the desirable $TiO_2$ product adversely affects the latter and may render the total product unsatisfactory for the desired ultimate pigmentary use. In addition, such $TiO_2$ scale formation and deposition produces uneven deposits on the reactor wall surfaces to cause undesired changes in the interior dimension of the reactor and its heat transfer characteristics. These undesired effects are particularly deleterious in oxidizing titanium tetrachloride in a flame type reactor, the design and size of which is necessarily critical and no dimensional changes are permissible if a successful, continuous and non-plugging operation is to be procured.

Various expedients have already been proposed for inhibiting oxide scale wall deposition in a titanium tetrachloride oxidation reactor. Thus, U.S. 2,670,272 provides a substantially rigid, porous refractory wall in the reactor which is maintained in cooled condition by forcing an inert, normal gaseous fluid, such as chlorine, in the liquid state into the wall during the decomposition. U.S. 2,670,275 proposes the utilization of a porous type refractory wall and prevention of contact of the reactants with the wall surfaces by diffusing an inert gas such as nitrogen through the wall in order to maintain a film of such inert gas over the internal wall surfaces within the reaction zone. Similarly, U.S. 2,915,367 maintains a film of a chlorine-containing gas over the internal surfaces of the reaction zone and prevents wall contact of the reactants therewith by slowly diffusing the gas from an external source through a porous type refractory wall.

Figure 2:
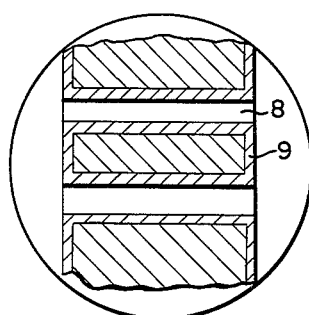

While these prior proposals have proved usefully advantageous for employment in $TiO_2$ pigment manufacture it has now been found that they can be effectively improved upon. It is accordingly among the objects of this invention to overcome certain disadvantages characterizing such prior methods. Further and particular objects of the invention include the overcoming of certain inherent disadvantages in the use of prior methods for the vapor phase oxidation of metal halides, especially titanium tetrachloride as well as to provide novel and effective methods for attaining these objects; to provide novel methods for producing valuable, improved forms of pigments—useful metal oxides, especially $TiO_2$, without encountering objectionable formation of adherent oxide scale deposits on the surfaces of the reactor apparatus employed in such production; to provide novel methods and means for improving plant efficiency and avoiding shut-downs and which will insure a prolonged, extended and continuous operation of the oxidation process without any attendant pluggage or corrosion difficulties normally characteristic of a titanium tetrachloride oxidation; and to provide novel procedures which in no way limit the choice of conditions favorable to the production of maximum yields of optimum quality $TiO_2$ pigments. Additional and special objects of the invention are to increase the lifetime effectiveness of the reactor employed in the oxidation and to overcome the wall cracking and disintegration difficulties attendant the use of prior types of reactors. Other objects and advantages of the invention will be obvious from the following description and accompanying diagrammatic drawings which are not to scale, are merely illustrative, and in which FIG. 1 is a vertical, sectional view of one useful form of apparatus for adapting the invention to practical application, while FIG. 2 consists of an enlarged sectional view of a portion of the reactor wall shown in FIG. 1.

These and other objects are attainable in this invention which embodies the discovery that in the manufacture of a metal oxide, particularly pigmentary $TiO_2$, by the oxidation of a metal halide such as titanium tetrachloride, highly advantageous processes and product improvements are obtained and without encountering reactor wall failure, cracking or objectionable oxide scale formation and deposition, when the oxidation reaction is carried out in a purge-gas-cooled foraminous-walled reaction zone rather than in a zone having porous walls as heretofore proposed.

In one specific and preferred adaptation the invention comprises reacting, at a temperature in excess of 1000° C., titanium tetrachloride and a humidified oxidizing gas, effecting such reaction in a relatively restricted reaction zone the walls of which consist of foraminated nickel pierced or otherwise suitably fabricated to provide a plurality of apertures or openings sufficient in number and size and so distributed that a substantially continuous flow and passage can be effected therethrough and into the reaction zone of a cooling gas to maintain said wall in relatively cool condition during the reaction and bring about any desired quenching or control over the oxidation reaction itself.

Referring to the drawings a vertical, conventional form of heating or furnacing means 1 is shown which may be wholly or partially insulated as desired and can be maintained at any required temperature by means of electrical or other heating means (not shown). A heating chamber 2 is provided in the means 1 through which a tubular or other form of conduit 3 composed of corrosion resistant metal or other material which will withstand any high temperature and corrosive action of reactants or reaction products to which it may be subjected during use. The conduit 3 contains an inlet 4 through which an oxygen-containing gas such as air or oxygen can be separately fed at any desired or controlled feed rate from a source of supply (not shown). An outlet 5 is provided in the lower part of the conduit 3 through which reaction products can be withdrawn from the apparatus for separation, treatment and recovery in suitable, associated equipment (not shown). Suitably provided within the conduit 3 substantially intermediate its length is a reaction zone 6 having an enveloping or enclosing wall member 7 which, as shown, form a substantial continuation of the wall elements 10 and 11. The wall 7 of the reaction zone 6 is composed of rigid, foraminous corrosion resistant sheet material, preferably of a metal, such as nickel, or a suitable alloy thereof and contains a plurality of preformed, pierced, drilled or otherwise fabricated passages or openings 8 in the form of holes, slots or apertures, said openings 8 being sufficient in number and size and so distributed throughout the wall 7 as to afford the free flow and passage through said openings and into the reaction zone 6 from a source of supply of a suitable cooling gas such as dry chlorine, phosgene or inert gases such as nitrogen, carbon dioxide, helium, argon, etc., preferably maintained at room (20° C.) or lower temperatures and within a range of up to 50° C. To insure optimum benefits and effects under the invention, it has been found preferable also to protect the exposed surfaces of the foraminate wall 7 with a protective coating 9 in the form of a tin film or layer of titanium dioxide, silica, or aluminum oxide, etc.

Suiably arranged above the wall 7 and disposed in spaced relationship about the conduit 3 an associated tubular conduit 12 is provided which also is preferably constructed of corrosion resistant material. An inlet 13, communicating with a passage 14 terminating as an annular discharge or circumferential slot jet outlet 15 is provided in said conduit 12. The outlet 15 can be formed, as shown, by suitable interpositioning of two sections of the conduit 3 in relatively close but spaced proximity to each other. Inlet 13 communicates with a suitable source of metal chloride supply (not shown) and passage 14 and the outlet 15 of the conduit 12 are in open communication with the interior of cylindrical conduit 3 and reaction zone 6. Concentrically disposed in spaced but in enclosing, gas-tight relationship about the foraminated wall 7 and reaction zone 6 is a casing 16, also composed of corrosion resistant material, the arrangement being adapted to form a passage 17 with an inlet 18 through which a suitable cooling gas from a source of supply (not shown) can be introduced into passage 17 for maintenance therein under any desired pressure and subsequent flow as desired through the wall openings 8 and into reaction zone 6.

Description will now be undertaken of one adaptation of the invention in an apparatus such as above described to produce pigmentary titanium dioxide according to a preferred application in which the methods disclosed in U.S. Patent 2,488,439 are utilized. In that patent, titanium tetrachloride is decomposed at temperatures ranging from about 800° C. and preferably in excess of 1000° C. and up to 1350° C. or 1450° C. by reacting it with an oxidizing gas such as oxygen, air, oxygen-enriched air, or mixtures, and in the presence of regulated amounts, say from .05–10% and preferably from 0.1% to 5% (based on the total volume of gases) of water vapor. The $TiCl_4$ and oxidizing gas reactants, in proper $TiCl_4$ to $O_2$ velocity ratio, are separately and continuously fed to the reactor, the oxidizing gas, in perheated state being fed via inlet 4 into conduit 3 and the reaction zone 6 containing a foraminous cylindrical wall 7 to which, preferably, a $TiO_2$ protective coating 9 has been applied. Prior to introduction of the oxidizing gas into the reaction zone 6, rapid admixture thereof with vaporized, $TiCl_4$ is effected by charging the $TiCl_4$ in the form of a thin sheet or stream into the oxidizing gas and from the circumferential slot inlet 15 forming an outlet for the passage 14 through which the $TiCl_4$ flows from the inlet 13. The reactant mixture and reaction products immediately pass into the reaction zone 6 where complete reaction is effected. Simultaneously with and throughout the introduction, passage and reaction of said oxidizing gas and $TiCl_4$ reactants, a wall and reaction zone coolant, preferably in the form of dry chlorine gas at a temperature of about 20° C., is continuously charged into and maintained under pressure within the passage or space 17 of the cylindrical jacketing element 16 which is sealed about and exteriorly surrounds the foraminous wall element 7. Preferably, a pressure in slight excess of that prevailing within the reaction zone 6 is maintained on the gaseous coolant in the passage 15 whereby such coolant will continuously flow through the perforated wall 7 to maintain said wall in cool state and preferably below a temperature of 300° C. throughout the reaction, as well as flow into the reaction zone itself and provide desired quenching and control over the temperature prevailing in the reaction zone 6. The resulting reaction products, containing $TiO_2$ in subpension, are withdrawn from the reactor via the outlet 5, are subjected to quick cooling or quenching to a temperature below 600° C. to prevent undesired $TiO_2$ particle size growth and the $TiO_2$ product is separated and recovered therefrom. It is then subjected to any desired finishing treatment to obtain thed esired high quality pigment grade $TiO_2$ product.

Utilization of a foraminous, gas-coolant-purged type of reaction wall as herein contemplated, will be found to effectively overcome objectionable oxide scale formation, wall build-up and plugging as well as the undesired pigment degradation encountered in the use of prior solid wall types of reactors or the objectionable pore-plugging, wall cracking and short lifetime failures which prior porous type walls have provided. In addition, such use will assure production of pigment quality $TiO_2$ in specification grade in respect to such properties as carbon black undertone (CBU) tinting strength and gloss. A further, distinctive advantage afforded by the invention is evident from a comparison between average operating lifetime of the present foraminous reactor wall insert with that of previous porous forms. For example the present insert will be found to desirably improve plant efficiency and provide a 30–50% increase in the daily plant production rate over a given annual period due to the avoidance of shutdown.

To a clear understanding of the invention the following specific examples are given. These are illustrative only and are not to be construed as limiting the underlying principles and scope of the invention.

*Example I*

This example involves the preparation of pigmentary $TiO_2$ through employment of a tubular reactor of the general construction shown in the drawing. Its foraminous reaction wall 7 was composed of ⅛" thick nickel sheet, 35" long with a 12" internal diameter. An average of 1¹/₁₆" diameter holes per sq. inch of wall surface were distributed substantially uniformly over the entire wall. Titanium tetrachloride, heated to 600° C. to 700° C., was supplied to the reactor at a rate of approximately 40,000 lbs. per hr., and oxidized in the reaction zone on admixture therein with a separately fed oxygen stream preheated to 1400° C. A 5% excess of oxidizing reagent, added at the rate of 7,100 lbs. per hr. and containing 3 lbs. of water per 100 lbs. of oxygen was used. Dry chlorine, at room temperature, was supplied throughout the reaction to the exterior walls of the foraminous nickel wall and at a rate of 2,500 to 3,000 lbs. per hr. (equivalent to approximately 0.0083 lb. of chlorine per sq. ft. of reactor wall area per lb. of titanium tetrachloride consumed) for passage through the holes and into the reaction zone, thereby maintaining said wall at a temperature below 300° C. The reaction proceeded over an extended period of time with recovery of high-grade pigmentary titanium dioxide and without substantial deterioration of the apertured nickel wall or build-up of oxide scale on its interior surfaces. At the conclusion of the run the wall surfaces were found to be very clean and smooth.

Example II

A reactor apparatus of the general structure shown in the drawings was used in this example to produce pigmentary $TiO_2$. The tubular reaction zone assembly of the apparatus comprised a perforated nickel wall cylinder 35″ in length, 3/16″ in thickness and had an internal diameter of 12″. An average of one 1/16″ diameter opening per square inch of surface was provided in the cylinder. Prior to use, the surface of the cylindrical wall was coated with a 1/32″ layer of titanium dioxide by painting thereover a slurry of 25% $TiO_2$ in water, following which a flow of air was passed through the wall holes to prevent their plugging with slurry during the drying operation. The tubular reaction wall was enclosed in a nickel jacket of the same length, having an internal diameter of 14¼″.

Dry chlorine at 40° C. was charged at a rate of 100 pound moles per hour into the jacket space 17 surrounding the perforated cylinder and continuously forced through the wall holes and into the reaction zone. Concurrently with such passage $TiCl_4$, preheated to 600–700° C. and containing 1.21 parts by weight of aluminum chloride per 100 parts of titanium $TiCl_4$ was fed at a rate of 250 pound moles per hour to the reactor and oxidized in its reaction zone 6 on admixture with a separately introduced stream of oxygen preheated to 1350° C. and containing water vapor equivalent to 5 parts of water per 100 parts of oxygen and fed to the reactor at a rate of 275 pound moles per hour. The oxidation reaction proceeded over an extended period of time with the perforated nickel wall maintained below 300° C. and without any adverse deterioration occurring in said wall. Additionally, no objectionable formation or build-up of oxide scale occurred on the interior surfaces of the tube. As a result, recovery was obtained of a high grade pigmentary $TiO_2$ product.

Example III

Utilizing a reactor of the general structure shown in the drawing, $TiCl_4$ was oxidized to produce pigmentary grade $TiO_2$. A tubular reaction zone assembly was employed in the apparatus and comprised a perforated nickel cylinder 1/8″ thick, 18″ in length and having a 7″ internal diameter. The apertured portion of the cylinder contained an average of one 1/16″ diameter opening per 1.25 sq. inch of cylinder surface. Prior to undertaking the reaction the surface of the wall cylinder was coated with about .002 inch of $TiO_2$ by painting a slurry of 50% $TiO_2$ in water thereover while a flow of drying gas was maintained through the wall perforations to prevent their plugging during the drying. The tubular reaction zone assembly was enclosed in a nickel jacket of the same length having an internal 9″ diameter.

Oxidation of the $TiCl_4$ reactant was effected within the apparatus reaction zone by quickly admixing it with a separately introduced stream of oxygen preheated to 1700° C. prior to its introduction into said zone. A 25% excess of oxygen reagent at the rate of 2000 pounds per hour was used, with the oxygen stream containing water vapor equivalent to 7.2 pounds of water per 100 pounds of oxygen. Throughout the reaction 1600 pounds of dry chlorine per hour at 20° C. was passed through the 1/16″ diameter wall openings and into the reaction zone to provide a wall purge density of 4.2 pounds chlorine per hour/square inch of reactor wall. After the reaction had satisfactorily proceeded over a period of 8 weeks, with recovery of a high grade pigmentary $TiO_2$ product, the run was interrupted and inspection made of the tubular reaction zone assembly. No disintegration of the nickel cylinder was observed nor was there any indication of objectionable $TiO_2$ scale formation or build-up on the internal surfaces of the cylinder.

Example IV

Employing the reactor described in Example III, dry nitrogen at 40° C. was passed into the jacket space provided therefor and forced through the wall cylinder perforations and into the reaction zone at a rate of 46 pound moles per hour. Simultaneously titanium tetrachloride, heated to 400–500°, and containing 1.2 parts by weight or aluminum chloride per 100 parts by weight of $TiCl_4$, was supplied to the reactor at a rate of 12,500 pounds per hour. Oxidation of the titanium tetrachloride in the reaction zone was effected by admixing it in said zone with a stream of oxygen preheated to 1600–1700° prior to admixture. The $O_2$ was added to the reaction zone in the form of a stream, using a 20% excess of that reagent at the rate of 2,500 pounds per hour. The oxygen stream contained water vapor equivalent to 7 pounds of water per 100 pounds of oxygen. The oxidation reaction continued for a period of several months without deterioration of the perforated nickel reaction zone wall or objectionable build-up of oxide scale occurring on the interior surfaces of the reaction tube, and resulted in recovery of a high grade pigmentary $TiO_2$ product.

Example V

In this example a reactor of the type described in Example II was employed to product pigmentary $TiO_2$. Dry chlorine at 40° C. was passed into the jacket space and forced through the wall perforations 8 and into the reaction zone at a rate of 100 pound moles per hour. Titanium tetrachloride heated to 400–500° C. and containing 1.2 parts by weight of aluminum chloride per 100 parts by weight of titanium tetrachloride was supplied to the reactor at a rate of 36,000 pounds per hour and was oxidized in its reaction zone in admixture therein with a stream of oxygen containing 5 pounds of water vapor per 100 pounds of oxygen and preheated to 1500–1700 prior to the admixture. The oxygen was added at the rate of 6400 pounds per hour. The oxidation reaction proceeded continuously over a prolonged period of time without any deterioration, cracking or failure of the perforated nickel reaction wall or build-up of oxide scale on its interior surfaces, and resulted in recovery of a high grade pigmentary $TiO_2$ product.

Example VI

A reactor of the general structure shown in the drawings was used in this example for producing $TiO_2$. The tubular reaction zone assembly comprised a 3/16″ thick, perforated nickel cylinder 19″ in length, with an internal 12″ diameter. The surfaces of this cylinder were provided with an average of two 1/16″ diameter wall perforations or holes per square inch of wall surfaces. The surface of the wall was coated with about .003 inch of titanium dioxide by painting thereon a slurry of 50% $TiO_2$ in water while maintaining a flow of gas through the perforations to prevent plugging during drying. The tubular element was enclosed in a nickel jacket of the same length having an internal diameter of 14¼″.

Dry chlorine at 40° C. was passed into the jacket space and forced through the perforations into the reaction zone at a rate of 35 pound moles per hour. Titanium tetrachloride heated to 300–500° C. was supplied at a rate of 250 pound moles per hour. The titanium tetrachloride contained 1.2 parts by weight of aluminum chloride per 100 of titanium tetrachloride. The titanium tetrachloride was oxidized in the reaction zone on admixture with a stream of oxygen which was heated to 1500–1600° C. prior to admixture and was added at the rate of 275 pound moles per hour, using 10% excess of that reagent. The oxygen stream contained 5 pounds of water vapor per 100 pounds of oxygen. The oxidation reaction continued over an extended period of time without encountering deterioration or cracking of the perforated nickel wall, or oxide scale build-up on its internal surfaces, and resulted in the recovery of a high grade pigmentary $TiO_2$ product.

Example VII

Example II was duplicated, employing the same temperatures, flow rates and reactants specified in that example but with utilization of a tubular reaction zone assembly made up of a ⅜" thick nickel cylinder 18" in length with a 12" internal diameter. This cylinder was perforated 16" from its upper extremity to form a ½" wide circumferential opening or slot. Liquid chlorine, at the rate of 50 pound moles per hour was passed into the jacket space as a coolant for the cylinder and was forced through the slot and into the reaction zone throughout the reaction. The oxidation reaction continued over a period of several days duration without any deterioration of the nickel reaction zone wall or oxide scale build-up on its interior surfaces and resulted in production and recovery of a high grade pigmentary $TiO_2$ product.

Although the invention has been described above as applied to certain specific embodiments employing particular reactants, concentrations, temperatures, retention times, ratios, velocities and apparatus, the invention is not limited thereto. Hence due variance therefrom is contemplated without departing from its underlying principles. Thus, while outstandingly useful for converting $TiCl_4$ through oxidation to $TiO_2$ to obtain a high quality pigment, the invention is also utilizable in the oxidation of other titanium halides or mixtures thereof, including the various chlorides, bromides, or iodides of that metal and of those of the metals zirconium, aluminum, antimony, tin, zinc, etc., which react in the vapor phase with a suitable oxygen-containing gas to product a solid metal oxide. Again while air or oxygen, suitably enriched with water vapor in the amounts alluded to, comprises a preferred, useful form of oxidizing gas, other types and amounts of oxidizing gases or mixtures thereof, in dry or humidified state also can be employed.

Normally, the oxidation reaction is conducted at near atmospheric pressure but the use of super or subatmospheric pressures is contemplated, with the differential in coolant pressure being correspondingly varied. Similarly, any type or size of reactor conforming to the intended scale of operation can be used, and while a continuous operation is preferred for employment, a discontinuous or batch type of operation can be resorted to if desired. The time of retention of the reactants and resulting metal oxide product in the reaction zone is critical and important where pigmentary $TiO_2$ is being manufactured. Such retention times can range from about .01 to 5 seconds generally, with a preferred range being from .1 to 1 second. With such retention times, one avoids undesired particle size growth and sintering, the existence of which would deleteriously affect ultimate $TiO_2$ properties, especially tinting strength.

In the drawing, the reaction vessel comprises a cylindrical foraminous tube suitably sealed into a gas-tight jacketing cylinder of larger diameter provided with an inlet for the introduction of a coolant into the space surrounding the apertured wall. The gas pressure within this space is maintained slightly greater or considerably higher, as desired, than that in the reaction zone, so that the coolant will necessarily flow steadily at any desired or controlled rate through, over and about the foraminous wall and into the reaction zone to maintain the wall in the relatively cool state desired. The amount of coolant used can be determined for each particular application and obviously will depend on the shape and size of the reaction vessel, the velocities, temperatures, composition of the reacting gases and the nature and temperature of the coolant, as well as the size of the apertures or openings 8 of the wall and the degree of protection which is to be effected.

Foraminous walls useful in the invention can consist of any useful high temperature, corrosion resistant rigid foraminous solid adapted to resist chlorine attack at temperatures below about 125° C. Although foraminated nickel comprises a preferred form of wall insert use is also contemplated of other rigid, impervious but foraminated materials including foraminous unglazed, porcelain, silica, firebrick, silicon carbide and various corrosion resistant metals and alloys such as nickel, steel, niobium, aluminum, iron and various ferrous alloys having good thermal conductivity. Oxide dispersed forms of these metals and alloys such as thoria-dispersed nickel, e.g. nickel containing 2% dispersed thorium oxide also can be employed.

As already noted such foraminous wall materials can be fabricated through conventional preforming, drilling, punching, piercing or otherwise forming the openings, holes, perforations, or slots desired. The apertures can be in any desired shape and in any desired angle of direction. Their size, shape, number and location can also be varied. Usually, wall openings are employed which range from about 6 to 10 times greater than the size of pores in a porous type wall which average less than 100 microns and usually have a range of 0.5 to 25 microns. In this invention wall openings or apertures ranging from ⅙" to ⅛" in size or diameter are preferred, with openings ranging in size from 1/64" to ½" being contemplated for use. Obviously, the smaller the hole size the larger would be the number thereof for a given area of wall surface while the larger the size the lesser will be the necessary number. The lower limit usually depends on the amount and size of particles being encountered in the purge gas while the largest number is usually established by the reactor diameter, pressure desired and purge density required to effect a desired operation of the process. Another controlling factor and consideration in establishing the number of wall openings or holes per square inch needed, is the construction, nature, strength and heat transfer characteristics of the foraminous wall material. In general the number and size of wall openings to be used should be such that the ratio of purge gas to $TiCl_4$ oxidized lies within a range of ⅓ to 1/20 parts by weight.

Since the shape of the wall opening is not an important factor in the invention, said opening can be described as the average opening area per square inch of the interior wall surface. As already noted, this can range preferably from 0.001 square inch to 0.01 to 0.1 square inch per square inch of internal wall area, while generally said range encompasses from about 0.001 square inch to 0.006 square inch per square inch of interior wall surface.

In procuring optimum benefits under the invention it has been found desirable and advantageous to precoat or otherwise protect the exposed surfaces of a foraminous metal wall insert with a titanium dioxide or other useful form of protective coating. The coating advantageously protects the metal and forms an unexpectedly smooth surface thereover. For this reason foraminous walls proved particularly advantageous over porous walls in that the protective coating can be applied without encountering objectionable pore plugging of the wall openings.

Several modes for effecting wall coating with a protective film can be resorted to. Thus the coating composition can be applied to the wall by painting or brushing an aqueous slurry of the titanium dioxide or other protective composition over the surface of the wall insert and prior to its installation for use in the reactor. The coating composition can comprise either raw or pigmentary $TiO_2$ slurried in water and acid to provide an 80% by weight $TiO_2$ acidic suspension at a pH of about 4 to 4.5. The resulting thick paste can be then employed to cast the foraminous wall into a non-shrinkable ceramic titanium dioxide foraminous reactor by pouring the slurry into a mold and drying it in an oven above 100° C. followed by firing treatment at about 1000 to 1300° C. to form the desired cast ceramic-like $TiO_2$ reactor wall. Alternatively, the slurry can be diluted to brushing consistency by further water addition and to form, say, a 30% TiO$_2$ slurry adapted to be applied over the internal wall surfaces being protected to form thereon, when dried, a 1/100th of an inch or greater coating.

I claim:

1. A method for preventing high temperature-corrosion attack and deterioration in a rigid jacketed reaction zone wall in which zone oxidation at an elevated temperature of a metal halide to produce a metal oxide is effected, which comprises forming said wall of a corrosion-resistant foraminous material containing a plurality of perforations ranging in size from 1/64" to 1/2" in average diameter, and in number equivalent to from .001 to .01 square inch per square inch of total interior wall area and during the oxidation reaction maintaining said wall at a substantially lower temperature than that prevailing in said reaction zone by charging a coolant into and through the perforations provided in said foraminous wall and into said reaction zone.

2. A method for preventing high temperature-corrosion attack and deterioration in a rigid jacketed reaction zone wall in which zone oxidation at an elevated temperature of a titanium halide to produce a titanium oxide is effected, which comprises forming said wall of a corrosion-resistant foraminous metal containing a plurality of perforations ranging in size from 1/64" to 1/2" in average diameter, and in number equivalent to from .001 to .01 square inch per square inch of total interior wall area and during the oxidation reaction maintaining said wall at a substantially lower temperature than that prevailing in said reaction zone by charging a coolant into and through the perforations provided in said foraminous wall and into said reaction zone.

3. A method for preventing high temperature-corrosion attack and deterioration in a rigid jacketed reaction zone wall in which zone oxidation at an elevated temperature of a metal halide to produce a metal oxide is effected, which comprises forming said wall of a corrosion-resistant foraminous nickel containing a plurality of perforations ranging in size from 1/64" to 1/2" in average diameter, and in number equivalent to from .001 to .01 square inch per square inch of total interior wall area and during the oxidation reaction maintaining said wall at a substantially lower temperature than that prevailing in said reaction zone by charging a coolant into and through the perforations provided in said foraminous wall and into said reaction zone.

4. A method for preventing high temperature-corrosion attack and deterioration of a rigid jacketed reaction zone wall in which zone oxidation at an elevated temperature of a metal chloride is effected to produce a metal oxide, which comprises forming said wall of a corrosion-resistant foraminous material containing a plurality of perforations ranging in size from 1/64" to 1/2" in average diameter, and in number equivalent to from .001 to .01 square inch per square inch of total interior wall area and during the oxidation reaction maintaining said wall at a substantially lower temperature than that existing in said reaction zone by charging a gaseous coolant maintained at temperatures up to about 50° C. into and through the perforations provided in said wall and into said reaction zone.

5. A method for preventing high temperature-corrosion attack and deterioration of a rigid jacketed reaction zone wall in which zone oxidation at an elevated temperature of a metal chloride is effected to produce a metal oxide, which comprises forming said wall of corrosion-resistant foraminous nickel having a plurality of perforations ranging in size from 1/64" to 1/2" in average diameter, with the number of said openings being equivalent to from .001 to .01 square inch per square inch of total interior wall area and containing a protective metal oxide coating over its surfaces, and during the oxidation reaction maintaining said wall at a substantially lower temperature than that which exists in said reaction zone by continuously charging a gaseous coolant maintained at temperatures up to about 50° C. into and through the perforations provided in said wall and into said reaction zone.

6. A method for preventing high temperature-corrosion attack and deterioration of a rigid confining wall for a reaction zone in which oxidation is effected at an elevated temperature of titanium tetrachloride to produce pigmentary titanium dioxide, which comprises forming said wall of a corrosion resistant foraminous nickel containing a plurality of wall perforations ranging in size from 1/16" to 1/8" in average diameter and in number the equivalent of from .001 to .006 square inch per square inch of total interior wall area, said wall having been precoated with a protective layer of titanium dioxide, and during the oxidation reaction maintaining said wall at a substantially reduced temperature over that existing in said reaction zone by charging a gaseous coolant into and through the perforations existing in said wall and into said reaction zone.

7. A method for preventing high temperature-corrosion attack and deterioration of a rigid wall confining a reaction zone wherein oxidation is effected at an elevated temperature of titanium tetrachloride to produce pigmentary titanium dioxide, comprising forming said wall of formainous nickel containing a plurality of wall perforations ranging in size from 1/16" to 1/8" in average diameter and in number the equivalent of from .001 to .006 square inch per square inch of total interior wall area, said wall having been precoated with a protective layer of titanium dioxide, and during the oxidation reaction maintaining it at a temperature not exceeding 300° C. by continuously charging gaseous chlorine maintained at temperatures up to about 50° C. into and through the perforations existing in said wall and into said reaction zone.

References Cited by the Examiner

UNITED STATES PATENTS

| 2,670,272 | 2/54 | Nutting | 23—202 |
| 2,670,275 | 2/54 | Olson, et al. | 23—202 |

MAURICE A. BRINDISI, *Primary Examiner.*